United States Patent
Correcher

(10) Patent No.: US 12,443,776 B2
(45) Date of Patent: Oct. 14, 2025

(54) SELECTION OF A TRANSFORMER MODEL

(71) Applicant: Schneider Electric Industries SAS, Rueil Malmaison (FR)

(72) Inventor: Sébastien Correcher, Le Ban-Saint-Martin (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 1073 days.

(21) Appl. No.: 17/467,559

(22) Filed: Sep. 7, 2021

(65) Prior Publication Data

US 2022/0075912 A1 Mar. 10, 2022

(30) Foreign Application Priority Data

Sep. 9, 2020 (FR) .................................. FR2009120

(51) Int. Cl.
*G06F 30/20* (2020.01)
*H01F 27/32* (2006.01)

(52) U.S. Cl.
CPC ............ *G06F 30/20* (2020.01); *H01F 27/323* (2013.01)

(58) Field of Classification Search
CPC .......... G06F 30/20; G06F 30/25; G06F 30/27; G06F 30/28; G06F 2111/00; G06F 2119/22; H01F 27/323
See application file for complete search history.

(56) References Cited

PUBLICATIONS

A. H. Soloot, H.K. Hoidalen, B. Gustavsen, "Modeling of wind turbine transformers for the analysis of resonant overvoltages", pp. 26-34 (Year: 2014).*
T. Nunn, "A Comparison of Liquid-Filled and Dry-Type Transformer Technologies", pp. 105-112, IEEE. (Year: 2000).*
A. Morched (SM), L. Mad (M), J. Ottevangers, "A High Frequency Transformer Model for the EMTP", pp. 1615-1626, IEEE (Year: 1993).*
Soloot, A. H. et al., "Modeling of Wind Turbine Transformers for the Analysis of Resonant Overvoltages", Electric Power Systems Research, vol. 115, Mar. 24, 2014, pp. 26-34.
Cheng, C.P. et al., "Simulation of Resonance Over-voltage During Energization of High Voltage Power Network", Electric Power Systems Research, vol. 76, No. 8, 2006, pp. 650-654.
Liu, Yanju et al., "Calculation of Very Fast Transient Over-voltage in Transformer Windings", Proceedings of International Conference on Electric Machines and Systems 2007, Oct. 8-11, Seoul, Korea, pp. 1300-1303.

(Continued)

*Primary Examiner* — Kibrom K Gebresilassie
(74) *Attorney, Agent, or Firm* — Troutman Pepper Locke LLP

(57) ABSTRACT

A method for selecting a transformer model, the method being carried out by a computer system, the method including:—modelling a transformer model including a coil configured to support an electric field;—determining a frequency interval including a set of resonant frequencies of the transformer model;—calculating a maximum electric field acting on the coil when a voltage oscillating over said frequency interval passes through the transformer model;—comparing the maximum electric field with a maximum allowable electric-field value; and—selecting the transformer model as a function of the comparison previously carried out.

20 Claims, 7 Drawing Sheets

(56) References Cited

PUBLICATIONS

Popov, Marjan et al., "Computation of Very Fast Transient Overvoltages in Transformer Windings", IEEE Transactions on Power Delivery, vol. 18, No. 4, Oct. 2003, pp. 1268-1274.
Eslamian, M. et al., "Analytical Calculation of Detailed Model Parameters of Cast Resin Dry-type Transformers", Energy Conversion and Management, vol. 52, No. 7, Jan. 15, 2011, pp. 2565-2574.
Search Report and Written Opinion dated May 25, 2021 for corresponding French Patent Application No. 2009120, 12 pages.
Anonymous: "Effet de pointe—Wikipedia", Jun. 5, 2020 (Jun. 5, 2020), XP093255558, Extrait de (Internet: URL:https://fr.wikipedia.org/w/index.php? title=Effet_de_pointe&oldid=171710819.
Office Action for European Patent Application No. EP21194769.2, dated Mar. 7, 2025.

\* cited by examiner

SELECTION OF A TRANSFORMER MODEL

TECHNICAL FIELD

The present disclosure relates to a method for selecting a transformer model. The present disclosure also relates to a computer program containing instructions for carrying out the method for selecting a transformer model, and also to a computer system. Lastly, the present disclosure relates to a method for manufacturing a transformer.

PRIOR ART

Conventionally, an electrical installation has a transformer for regulating the voltage values of an electric current flowing in the installation. The transformer has a winding formed by one or more coils that are placed around a magnetic core of the transformer.

In certain cases, a circuit breaker is also provided in the electrical installation in order to protect the transformer against a risk of overload or short circuit.

It is, however, known that a high-frequency overvoltage may reach the transformer during the operations of opening or closing the circuit breaker. This overvoltage may cause breakdown of the transformer.

In particular, breakdown of the transformer may occur when an overvoltage amplitude exceeds a voltage amplitude supported by the transformer. In other words, breakdown of the transformer may take place when the overvoltage exceeds a basic impulse level of the transformer, also referred to as the "BIL level".

This problem is ordinarily solved by installing a surge arrester connected to the transformer. The surge arrester makes it possible to attenuate or filter the amplitude of the voltages arriving in the transformer, so as to ensure that they are below the BIL level of the transformer. In certain cases, this problem is solved by installing earthed varistors in the transformer. The varistors have a rated voltage higher than the voltage supported by the transformer. When the amplitude of the voltages arriving in the transformer exceeds the BIL level of the transformer, the overvoltage reaching the varistor is conducted to earth and not to the transformer. The transformer is thus protected against the overvoltages.

Breakdown of the transformer may nevertheless also occur when the winding experiences a resonance phenomenon. This phenomenon may take place when a voltage flowing in the transformer oscillates at a frequency corresponding to a resonant frequency of the transformer.

Currently, the risk of a resonance phenomenon in the winding is limited by installing an RC filter connected to the transformer. The RC filter makes it possible to reduce the frequency of the voltage flowing in the transformer, so as to move it away from the resonant frequencies of the transformer.

Nevertheless, installing the RC filter involves installing an additional element in the electrical installation, which makes use and maintenance of said electrical installation more complicated.

SUMMARY

The present disclosure aims to improve the situation.

To this end, a method for selecting a transformer model is described, the method being carried out by a computer system, the method comprising:
modelling of a transformer model comprising a coil configured to support an electric field;
determination of a frequency interval comprising a set of resonant frequencies of the transformer model;
calculation of a maximum electric field acting on the coil when a voltage oscillating over said frequency interval passes through the transformer model;
comparison of the maximum electric field with a maximum allowable electric-field value; and
selection of the transformer model as a function of the comparison previously carried out.

Thus, advantageously, the selection of the transformer model is carried out by modelling the maximum electric field acting on the coil when the voltage oscillating in the frequency interval comprising the set of resonant frequencies of the transformer model passes through the transformer model. Comparison of the maximum electric field with the maximum allowable electric-field value makes it possible to select the transformer model unlikely to cause breakdown under the effect of the voltage oscillating in said frequency interval. The risk of breakdown of the coil when the voltage flowing in said transformer model oscillates at one of the resonant frequencies of the selected transformer model is thus limited.

Unlike a calculation of the electric voltage for example, the calculation of the electric field allows geometry and sizing to be taken into account in the transformer model, in particular of the coil, which may include irregularities, such as peaks in which an accumulation of charges can occur, giving rise to a significant electric field.

This therefore makes it possible to limit the risk of breakdown of the transformer without the need to install additional elements.

Furthermore, since the method is carried out by the computer system, a plurality of transformer models may be modelled and tested while reducing the material and economic costs.

In certain cases, the determination of the frequency interval comprising the set of resonant frequencies of the transformer model is carried out on the basis of the determination of an impedance response of the transformer model. In certain examples, a graph representing the variation of the impedance of the transformer model as a function of the frequency at which a voltage acting on said transformer model is oscillating may be obtained. On the basis of this graph, the frequency interval comprising the set of resonant frequencies of the transformer model may be determined.

In certain cases, the method for selecting a transformer model furthermore comprises the determination of a voltage distribution in the coil. Determination of the voltage distribution makes it possible, for example, to determine the variation of a voltage gradient along the coil. In certain cases, the selection of the transformer model takes into account a characteristic of the voltage distribution in the coil. Thus, the selection of the transformer model may for example be carried out such that the voltage distribution is as constant as possible along the coil.

In certain cases, the modelling of the transformer model comprises modelling of the coil with a plurality of slices, each slice of the coil comprising a plurality of turns. The modelling makes it possible, for example, to choose a number of slices and a number of turns of the coil. Depending on the number of slices and turns of each slice, the maximum electric field acting on the coil may be different. Likewise, the maximum allowable electric-field value may be different. In certain cases, the modelling of the transformer model comprises modelling of the coil with a space provided between each slice of the coil. The modelling makes it possible, for example, to choose a distance between each of the slices of the coil. Depending on the distance between slices, at least one out of the maximum electric field acting on the coil and the maximum allowable electric-field value may be different. Likewise, the voltage gradient along the coil may be different. In certain cases, the modelling of the transformer model comprises the choice of a material arranged between each turn of the plurality of turns of the coil. Thus, depending on the material chosen, the maximum electric field acting on the coil may be different. Likewise, the maximum allowable electric-field value may be different. The modelling furthermore makes it possible to calculate the maximum electric field in the transformer model as a function of the characteristics of the transformer model and of a specific input voltage.

In certain cases, the modelling of the transformer model comprises the choice of a resin for coating the coil. Thus, depending on the resin chosen, the maximum electric field acting on the coil may be different. Likewise, the maximum allowable electric-field value may be different.

In certain cases, the coil is modelled so as to choose at least one structural parameter from:
- a total number of slices;
- a total number of turns in each slice;
- a length of the space provided between each slice of the coil;
- a distance between concentric high-voltage coils and low-voltage coils;
- the material arranged between each turn of the plurality of turns of the coil; and
- the resin coating the coil.

Thus, the characteristics of the coil being modelled may change as a function of the choice of the structural parameters, which makes it possible to obtain different behaviours for the transformer model. Thus, it is possible to select the transformer model with a satisfactory behaviour when the voltage oscillating over the frequency interval comprising the set of resonant frequencies of the transformer model acts on said transformer model.

In certain cases, the method for selecting a transformer model furthermore comprises the modelling of one or more additional transformer model(s), each additional transformer model comprising a respective coil configured to support a respective electric field, the method furthermore comprising the determination of a frequency interval comprising a set of respective resonant frequencies of each additional transformer model. Thus, a plurality of transformer models may be tested before selecting a transformer model.

According to another aspect, a method for manufacturing a transformer, comprising the above-described method for selecting a transformer model, is described, the manufacturing method comprising the manufacture of the transformer according to the selected model. The manufacturing method therefore makes it possible to obtain the transformer having characteristics corresponding to the selected transformer model.

In certain cases, the transformer is a dry-coated transformer. Thus, a resin coats the coil of the transformer, which makes it possible, inter alia, to prevent the coil of the transformer from coming into contact with a fluid flowing in proximity to the transformer.

According to another aspect, a computer program is described, containing instructions for carrying out the method for selecting a transformer model as described above when this program is executed by a processor suitable for carrying out said method for selecting a transformer model. Thus, the method for selecting a transformer model may be carried out by the computer program, which avoids the randomness of manual implementation.

According to another aspect, a computer system is described, comprising a processor suitable for carrying out the method for selecting a transformer model as described above. Thus, the method for selecting a transformer model may be carried out by the computer system. This makes it possible, inter alia, to repeat said method for selecting a transformer model several times while limiting costs.

BRIEF DESCRIPTION OF THE DRAWINGS

Other features and advantages will become apparent during the following description of some embodiments, which are given by way of non-limiting example, with reference to the appended drawings. In the drawings.

DESCRIPTION OF THE EMBODIMENTS

Figure 1:
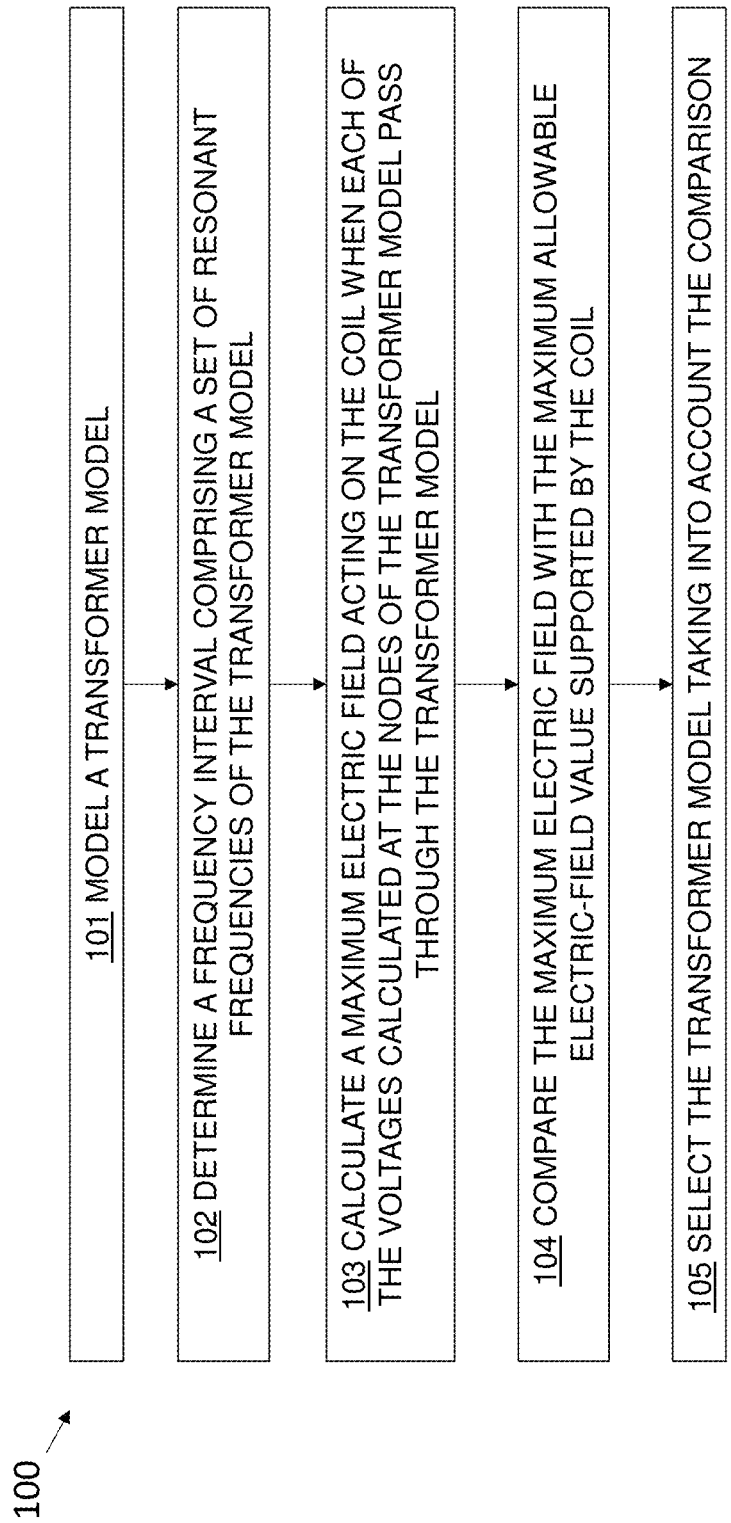
FIG. 1 shows a first example of a method for selecting a transformer model according to the present disclosure.

In the various figures, references that are the same denote identical or similar elements.

This explanation relates to a method for selecting a transformer model.

A selection method may be understood as a specific protocol leading to the choice of the transformer model. The aim of the protocol is in particular to choose a transformer model as a function of a performance level estimated for the transformer model in a specific context. In certain cases, the aim of the protocol is to choose the transformer model from a plurality of transformer models. In certain cases, the plurality of transformer models comprises at least two transformer models. In such cases, the choice of the transformer model is made as a function of a performance level estimated for each transformer model in a specific context. More precisely, in such cases the aim of the protocol is to make it possible to choose the transformer model having an improved performance level in the specific context from the plurality of transformer models. In certain cases, the choice of the transformer model is made from a plurality of transformer models having a satisfactory performance level in the specific context as a function of the parameters such as the cost or the availability of the required materials. In such cases, the transformer model chosen is the one for which the required materials are less expensive or more available.

The specific context may comprise a set of parameters external to the transformer model, which have an influence on the estimated performance level of said transformer model. Examples of external parameters influencing the performance level of the transformer are for example an electric field, a voltage or an intensity acting on the transformer model. In the following text, the expression "electric field" refers for example to an intensity of a field created by electrically charged particles. The electric field is, for example, expressed in volts per metre (V/m).

The performance level is understood as a behaviour intended for the transformer model when it is in said specific context. In certain examples, the performance level is the capacity of the transformer model to support the electric field, the voltage or the intensity acting on the transformer model, while avoiding or reducing the possibility of being damaged. In certain cases, the performance level may depend on a value of the electric field acting on the transformer model. In these cases, the performance level is deemed to be acceptable when the value of the electric field acting on the transformer model is less than a maximum allowable electric-field value.

"Maximum allowable electric-field value" is intended to mean an electric-field value acting on the transformer model, below which the possibility of the transformer model being damaged is limited. A maximum allowable electric-field value is, for example, 10 kV/mm. A maximum allowable electric-field value is, for example, 15 kV/mm. A maximum allowable electric-field value is, for example, 5 kV/mm.

"Transformer model" is intended to mean virtual creation of a transformer. A transformer may be understood as an electrical device configured to convert an input signal into an output signal on the basis of an electromagnetic induction phenomenon. The input signal and the output signal are in certain cases alternating signals. The input signal is, for example, characterized by a first intensity and a first voltage. The output signal is, for example, characterized by a second intensity and a second voltage. The first intensity is different from the second intensity, and the first voltage is different from the second voltage. The first intensity and the first voltage define, at least partly, said specific context of the transformer model.

The transformer comprises at least one coil and a magnetic circuit, also referred to as magnetic core. In certain examples, the transformer comprises at least one high-voltage coil and at least one low-voltage coil, which are concentric. The magnetic core is made of ferromagnetic material. In certain examples, the magnetic core is a soft iron core. The magnetic core may comprise an upper yoke, a lower yoke and at least one limb. In certain cases, the magnetic circuit may comprise a single yoke and at least one limb. The at least one limb and the yoke(s) are each formed by a set of mutually adjacent plates. The at least one limb extends, for example, substantially perpendicularly to the yoke(s). In certain cases, the transformer comprises two limbs connected to one another by the yoke(s). In certain cases, the transformer comprises three limbs connected to one another by the yoke(s), for example when the transformer is a three-phase transformer. Any other number of limbs may be envisaged.

A coil according to this explanation forms part of a winding. "Winding" is intended to mean a set of turns forming an electrical circuit associated with one of the voltages for which the transformer has been set up. Depending on the voltage assigned to the winding, the winding is a high-voltage winding or a low-voltage winding. The high-voltage winding is the winding of a given transformer whose assigned voltage is the highest. The low-voltage winding is the winding of a given transformer whose assigned voltage is the lowest.

A coil according to this explanation is, for example, a high-voltage coil. "High-voltage coil" is intended to mean a coil forming part of a higher-voltage winding. The coil is thus capable of receiving high-frequency overvoltages because it can be connected to a high-voltage circuit breaker.

According to this explanation, a coil may comprise a set of slices. The slices are distributed along a longitudinal direction of each coil. In certain cases, the coil comprises more than seven slices. In certain cases, the coil comprises fewer than twenty slices. In certain cases, the coil comprises between seven and fifteen slices. The consecutive slices are separated from one another by a space. Each space between consecutive slices has a predetermined length. The predetermined length corresponds to a distance between two consecutive slices. In certain cases, all the spaces between consecutive slices have the same predetermined length. In certain cases, the spaces between consecutive slices have different lengths. The slices are, for example, connected to one another in series.

In certain examples, each slice comprises a set of turns. In certain examples, each slice comprises several tens of turns. In certain cases, the set of turns of each slice is formed by windings of a metal wire in a plane substantially perpendicular to a longitudinal direction of the coil, corresponding to a longitudinal direction of a limb of the transformer. Each slice is then contained in a respective plane. In certain cases, the set of turns of each slice is formed by windings of the metal wire in a plurality of stacked planes which are substantially perpendicular to the longitudinal direction of the coil. The metal wire may, for example, be a copper wire. The wire may have a cylindrical or flat shape, for example. In certain examples, more than 500 turns are provided in the coil. In certain examples, fewer than 1000 turns are provided in the coil.

In certain examples, an insulating material is arranged between each turn. The insulating material is, for example, a polymer material. In certain cases, the insulating material is polyethylene terephthalate (PET). The insulating material electrically insulates the turns from one another.

This explanation relates, for example, to dry-coated transformers. In a dry-coated transformer, each coil is enclosed by a resin. In certain examples, the resin is a thermosetting resin. In certain examples, the resin is an epoxy resin. The resin prevents each coil from coming into contact with a fluid flowing in proximity to the transformer. The fluid is, for example, water vapour causing an ambient humidity around the transformer. Likewise, the resin prevents polluting particles from coming into contact with each coil. The resin also makes it possible to limit the fire risk of the transformer. The dry-coated transformer is furthermore characterized by the fact of using only air for cooling. This makes it possible to simplify its structure, reduce its size and limit the costs of use and maintenance. In certain cases, each coil is coated with an insulating material different from the resin. In certain examples, the insulating material is a polymer.

A coil according to this explanation is, for example, wound around a limb of the magnetic core. In certain cases, a single coil is wound around each limb of the magnetic core. In other cases, a plurality of coils are wound around certain limbs or each limb.

There are many types of transformer, depending on the number of windings per transformer and the number of coils per limb of the magnetic core of the transformer. In certain cases, the transformer may comprise two coils, each wound around separate limbs of the magnetic core. One of the coils is referred to as "primary winding", and the other coil as "secondary winding". The primary winding is configured to receive the input signal and the secondary winding is configured to create the output signal. The transformer is then a single-phase transformer. In certain cases, the transformer may comprise two coils wound around each of the limbs. Each limb is then provided with a primary winding and a secondary winding. When the transformer comprises three limbs, each having a primary winding and a secondary winding wound around it, the transformer is a three-phase transformer. In certain cases, the transformer comprises a single coil wound around one of the limbs of the magnetic core. The single coil simultaneously fulfils the function of primary winding and secondary winding. In this case, the transformer is an autotransformer.

The primary winding is configured to create a magnetic flux after receiving the input signal. The magnetic flux is transmitted to the magnetic core. In the magnetic core, the magnetic flux flows until it reaches the secondary winding, which is configured to create the output signal.

This explanation also relates to a computer system configured to carry out the method for selecting a transformer model. The method for selecting a transformer model according to the present explanation is therefore carried out by the computer system. The computer system comprises a processor suitable for carrying out the method for selecting a transformer model. In certain examples, the processor comprises electronic calculation circuits managed by the computer system and making it possible to implement a series of algorithms required for the operation of said computer system. In certain cases, the computer system is configured to be controlled by a user of said computer system. In certain cases, the computer system is configured to operate automatically, without intervention by a user of said computer system.

This explanation also relates to a computer program containing instructions for carrying out the method for selecting a transformer model when this program is executed by the processor of the computer system.

This explanation furthermore relates to a method for manufacturing a transformer. The manufacturing method is understood as a protocol comprising a set of techniques intended for physically obtaining the transformer. "Physically obtaining" is intended to mean obtaining the transformer in material form. In particular, the manufacturing method is intended to obtain in material form the transformer corresponding to the transformer model chosen after applying the method for selecting a transformer model. Of course, a plurality of transformer models chosen during the method for selecting a transformer model may be the subject of the manufacturing method. The method for manufacturing the transformer comprises, for example, the production of at least one coil and the magnetic core and the assembling of the coil and the magnetic core.

FIG. 1 shows an example of a method 100 for selecting a transformer model. The selection method 100 comprises blocks 101-105, which will be explained below.

The method 100 for selecting the transformer model comprises, in block 101, the modelling of a transformer model. "Modelling" is intended to mean the production of a transformer model as described above. To this end, dedicated modelling or simulation software carried out by an example of computer system 400 may be employed. The computer system 400 will be described below with reference to FIG. 7.

Figure 2:
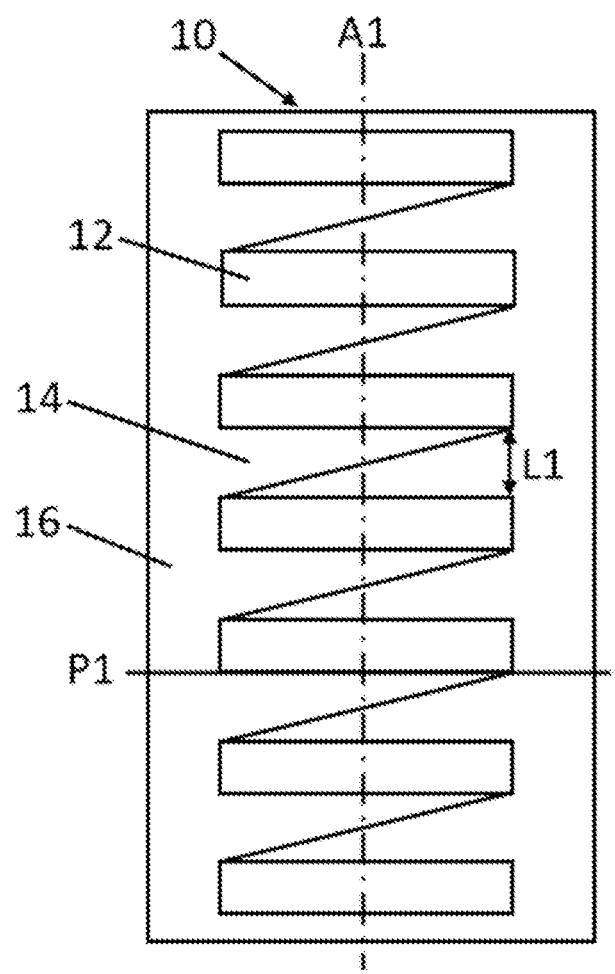
FIG. 2 shows a schematic view of a longitudinal section of a first example of a coil of a transformer.

The modelling of the transformer model comprises the modelling of a coil 10. FIG. 2 shows a schematic view of an example of coil 10. The coil 10 forms part of the transformer model. In certain examples, the coil 10 is a high-voltage coil. As mentioned above, the high-voltage coil is capable of receiving high-frequency overvoltages because it can be connected to a high-voltage circuit breaker (not represented).

The modelled coil 10 has a structure similar to the transformer coil structure presented above. In particular, the coil 10 is modelled with a plurality of slices 12. The plurality of slices 12 are distributed along a longitudinal direction A1 of the coil 10. The modelling of the coil 10 comprises a choice of a total number of slices 12 in the coil 10. In the example of FIG. 2, seven slices 12 are represented, although this number of slices 12 is not limiting. In certain cases, the coil 10 comprises more than seven slices 12. In certain cases, the coil 10 comprises fewer than twenty slices 12. In certain cases, the coil 10 comprises between seven and fifteen slices 12.

A space 14 is provided between two successive slices 12. A length L1 of the space 14 corresponds to a distance along the longitudinal direction A1 between the two successive slices 12 of the coil 10. The modelling of the coil 10 comprises a choice of the length of the space 14. In certain cases, all the spaces 14 between two successive slices 12 have the same length L1. In certain cases, the length L1 of at least one of the spaces 14 is different from the length L1 of other spaces 14.

The coil 10 is also modelled, in certain cases, with a plurality of turns (not illustrated) contained in each slice 12. In certain cases, the plurality of turns of each slice 12 is formed by windings of a metal wire around the longitudinal direction A1 of the coil 10. In certain examples, the windings of the metal wire forming the turns of each slice 12 are made in a plane P1 substantially normal or perpendicular to the longitudinal direction A1 of the coil 10. In other words, the metal wire is wound in a spiral around the longitudinal direction A1 in the plane P1 so as to form a plurality of loops of the metal wire in the plane P1. Each loop of the metal wire in the plane P1 corresponds to one turn. Each slice 12 is associated with a respective plane P1.

The modelling of the coil 10 comprises a choice of a total number of turns in each slice 12. In certain cases, each slice 12 comprises more than 50 turns. In certain cases, each slice 12 comprises fewer than 100 turns. In certain cases, each slice 12 comprises between 50 and 100 turns. Each slice 12 may contain an equal number of turns. In certain cases, at least one slice 12 contains a number of turns different from the number of turns of the other slices 12. In certain examples, more than 500 turns are provided in the coil 10. In certain examples, fewer than 1000 turns are provided in the coil 10.

A material (not illustrated) is arranged between each turn. The modelling of the coil 10 also comprises a choice of the material arranged between each turn of the coil 10. The material is an insulating material. The material is, for example, a polymer material. In certain cases, the material is poly (ethylene terephthalate) (PET).

In certain cases, as illustrated in FIG. 2, the coil 10 is coated with a resin 16. The resin 16 is placed around the coil 10. Furthermore, the resin 16 fully or partly fills the spaces 14 between two successive slices 12. The modelling of the coil 10 also comprises a choice of the resin 16. In particular, the choice of the resin 16 comprises at least one of a choice of a type of resin or a choice of a composition of said resin. In certain examples, the resin 16 is an epoxy resin.

For the modelling of the coil 10, the choices of the total number of slices 12, of the total number of turns, of the length L1 of the space 14, and of the material between turns or of the resin 16 may be made manually by the user of the computer system 400. The manual choice may, for example, be made using a graphical interface of the computer system 400. In certain cases, the choices of the total number of slices 12, of the total number of turns, of the length L1 of the space 14, and of the material between turns or of the resin 16 are made automatically by the computer system 400. According to one example, the automatic choice by the computer system 400 may be made randomly. According to one example, the automatic choice may take into account the choices made beforehand for the modelling of other transformer models, so as to ensure that the transformer model being modelled has at least one different characteristic from the transformer models modelled previously.

In the transformer model, the coil 10 fulfils the function of primary winding, as described above. Of course, the transformer model may be modelled with a plurality of coils such that the function of secondary winding as described above is fulfilled by a different coil from the coil 10. Likewise, as in the transformer example presented above, the transformer model may comprise at least one low-voltage coil concentric with the high-voltage coil.

The coil 10 is configured to support a maximum allowable electric-field value. The maximum allowable electric-field value corresponds to an electric field that can flow in the coil 10 without structurally and/or functionally damaging the coil 10. In certain cases, the maximum allowable electric-field value may correspond to an electric-field value beyond which the coil 10 starts to become damaged. In certain cases, the maximum allowable electric-field value corresponds to any other electric-field value ensuring that the coil 10 is not damaged.

The maximum allowable electric-field value may depend on the length L1 of the space 14 between two successive slices 12, on the material arranged between each turn and on the resin 16, which are chosen for the coil 10 during the modelling of the transformer model. In certain examples, depending on the resin 16 chosen, the resin 16 will withstand different electric-field values without being damaged. Thus, the maximum allowable electric-field value may vary as a function of the resin 16 chosen. In certain examples, depending on the chosen material between turns, said material will withstand different electric-field values without being damaged. Thus, the maximum allowable electric-field value may vary as a function of the chosen material between turns.

In certain cases, in order to carry out the method 100, the coil of the transformer model is modelled so as to choose at least one structural parameter from:
  the total number of slices 12;
  the total number of turns in each slice 12;
  the length L1 of the space 14;
  a distance between concentric high-voltage coils and low-voltage coils;
  the material arranged between each turn of the plurality of turns of the coil; and
  the resin 16.

Thus, the maximum allowable electric-field value supported by the coil 10 may be different depending on the choices made for the structural parameters. The performance profile of the transformer model being modelled may therefore vary as a function of the choices made for said structural parameters.

Block 102 of the method 100 comprises the determination of a frequency interval comprising a set of resonant frequencies of the transformer model. In certain cases, "frequency interval" is intended to mean a continuous set of oscillation frequencies of a voltage passing through the transformer model. In certain cases, "frequency interval" is intended to mean a discrete set of oscillation frequencies of the voltage passing through the transformer model. "Resonant frequencies" is intended to mean oscillation frequencies of the voltage passing through the transformer model, for which a resonance phenomenon takes place.

The determination of the frequency interval comprising the set of resonant frequencies of the transformer model is carried out, for example, on the basis of determination of the impedance response of the transformer model.

The determination of the impedance responses of the transformer model is carried out by the computer system 400. On the basis of the determination of the impedance response of the transformer model, an impedance curve is obtained.

"Impedance curve" is intended to mean a curve representing a variation of a modulus and/or of an argument of an impedance of the transformer model as a function of an oscillation frequency of the voltage passing through the transformer model.

Figure 3:
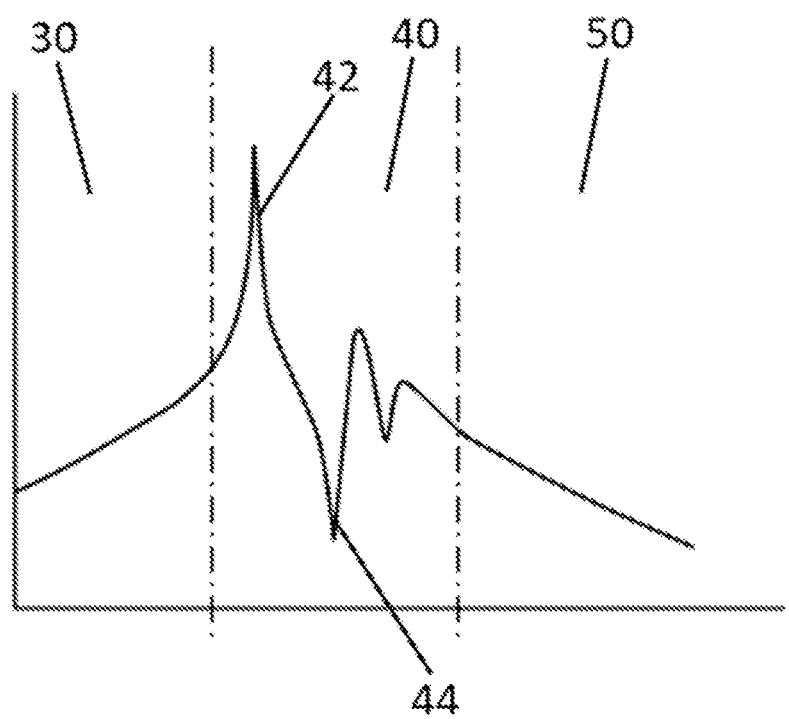
FIG. 3 shows a graph representing an example of an impedance curve associated with the coil of FIG. 2.

FIG. 3 shows a graph representing an example of an impedance curve associated with the transformer model. The abscissa axis corresponds to the oscillation frequency of the voltage passing through the transformer model. The ordinate axis corresponds to the modulus or the argument of the impedance of the transformer model.

The impedance curve has a first zone 30, a second zone 40 and a third zone 50. The first zone 30 corresponds to a low-frequency zone. In the first zone 30, the transformer model has an inductive behaviour. The inductive behaviour is characterized by an increase in the impedance when the oscillation frequency of the voltage passing through the transformer model increases.

The third zone 50 corresponds to a high-frequency zone. In the third zone 50, the transformer model has a capacitive behaviour. The capacitive behaviour is characterized by a decrease in the impedance when the oscillation frequency of the voltage passing through the transformer model increases.

The second zone 40 corresponds to a zone of intermediate frequencies between the low-frequency zone and the high-frequency zone. In the second zone, the impedance curve is characterized by the presence of a set of peaks 42 and a set of troughs 44. The frequency at which each peak 42 and each trough 44 of the impedance curve appears corresponds to a resonant frequency of the transformer model.

Thus, obtaining the impedance curve makes it possible to determine the frequency interval comprising the set of resonant frequencies of the transformer model. In certain cases, the frequency interval determined comprises all the resonant frequencies of the transformer model. In certain cases, the frequency interval determined comprises only some of the resonant frequencies of the transformer model. In certain examples, the first peak 42 of the impedance curve corresponds to an oscillation frequency of the voltage passing through the transformer model, at which the risk of damage to the transformer model is low. Consequently, the first peak 42 of the impedance curve may be excluded from the frequency interval determined. "First peak" is intended to mean the peak 42 associated with the lowest frequency among the peaks 42. In certain cases, the first trough 44 of the impedance curve corresponds to an oscillation frequency of the voltage passing through each transformer model, at which the risk of damage to the transformer model is particularly high. Consequently, the first trough 44 of the impedance curve may be included in the frequency interval determined. "First trough" is intended to mean the trough 44 associated with the lowest frequency among the troughs 44.

The impedance response of the transformer model varies as a function of the choices made for the number of slices 12, the number of turns, the length L1 of the spaces 14, the distance between the concentric high-voltage coils and low-voltage coils, the material between turns, and the resin 16 of the coil 10 during the modelling according to block 101.

Block 102 may furthermore comprise the choice of a frequency increment. The frequency increment chosen determines a set of frequencies, included in the frequency interval determined, for which a voltage at nodes of the transformer model is calculated. The voltage calculated at the nodes of the transformer model is therefore a voltage oscillating over the frequency interval determined. "Oscillating voltage" is intended to mean a voltage varying with time. In certain cases, the chosen frequency increment is fine. Thus, the number of frequencies, for which the voltage at the nodes of the transformer is calculated and which are included in the frequency interval determined, increases.

Block 103 of the method 100 comprises the calculation of a maximum electric field acting on the coil 10 when each of the voltages calculated at the nodes of the transformer model pass through the transformer model. The calculation of the electric field is carried out by the computer system 400. In particular, the computer system 400 is configured to simulate the passage of a set of voltages oscillating at the frequencies included in the determined frequency interval through the transformer model. Thus, a set of electric-field values acting on the coil is obtained. Each electric-field value obtained is therefore associated with one of the voltages oscillating at the frequencies of the frequency interval. On the basis of the set of electric-field values which is obtained, the maximum electric field is determined. In particular, the maximum electric field corresponds to the greatest of the electric-field values obtained that act on the coil 10.

According to one example, the calculation of the maximum electric field according to block 103 could be carried out by the computer system 400 on the basis of the simulation of the passage through the transformer model of the voltages oscillating only at the frequencies corresponding to the peaks 42 and the troughs 44 included in the frequency interval determined. Thus, a set of electric-field values acting on the coil 10 when only the voltages oscillating at the resonant frequencies of the transformer model that are included in the frequency interval determined pass through the transformer model is obtained.

In certain cases, the smaller the peaks 42 and the troughs 44, the lower the maximum electric field of the transformer model.

Block 104 of the method 100 comprises comparison of the maximum electric field with the maximum allowable electric-field value supported by the coil 10. In particular, the comparison between the maximum electric field and the maximum allowable electric-field value makes it possible to determine whether the maximum electric field is, for example, strictly less than the maximum allowable electric-field value. In certain cases, the computer system 400 is configured to determine whether the maximum electric field is strictly less than the maximum allowable electric-field value. In certain cases, the user of the computer system 400 may themself determine whether the maximum electric field is strictly less than the maximum allowable electric-field value.

Block 105 of the method 100 comprises the selection of the transformer model. The selection according to block 105 takes into account the comparison according to block 104. In certain examples, the transformer model will be selected if the maximum electric field is strictly less than the maximum allowable electric-field value. Choice of the transformer model of which the maximum electric field is strictly less than the maximum allowable electric-field value makes it possible to select the transformer model having a limited risk of being damaged in the presence of an overvoltage.

In certain cases, if during the comparison according to block 104 the maximum electric field is greater than or equal to the maximum allowable electric-field value supported by the coil 10, the modelled transformer model is not selected. In these cases, the method 100 may be repeated starting from the modelling according to block 101 of another transformer model differing from the unselected transformer model at least in one of the aforementioned structural parameters. The method 100 may, in particular, be repeated successively until a transformer model is selected.

In certain cases, the modelling contained in block 101 of the method 100 is not limited to the modelling of a single transformer model. The modelling contained in block 101 may comprise the modelling of one or more additional transformer model(s). In this case, each additional transformer model comprises a respective coil. Each respective coil is structurally and functionally similar to the coil 10. Thus, each respective coil is defined by a number of slices, a number of turns, a length of a space between two successive slices, a material arranged between the turns and a material coating the coil. Thus, each respective coil is configured to support a respective maximum allowable electric-field value. The method 100 as described above is then applied separately for each transformer model being modelled. A plurality of transformer models may then be selected during the selection according to block 105. In these cases, a final selection may be provided in order to select a single transformer model from the transformer models selected during the selection according to block 105. The final selection may, for example, be determined by a difference between the maximum allowable electric-field value of each selected transformer model. The final selection may, for example, be determined by the manufacturing cost of each selected transformer model. The final selection may, for example, be determined by the availability of the materials required for each selected transformer model.

Figure 4:
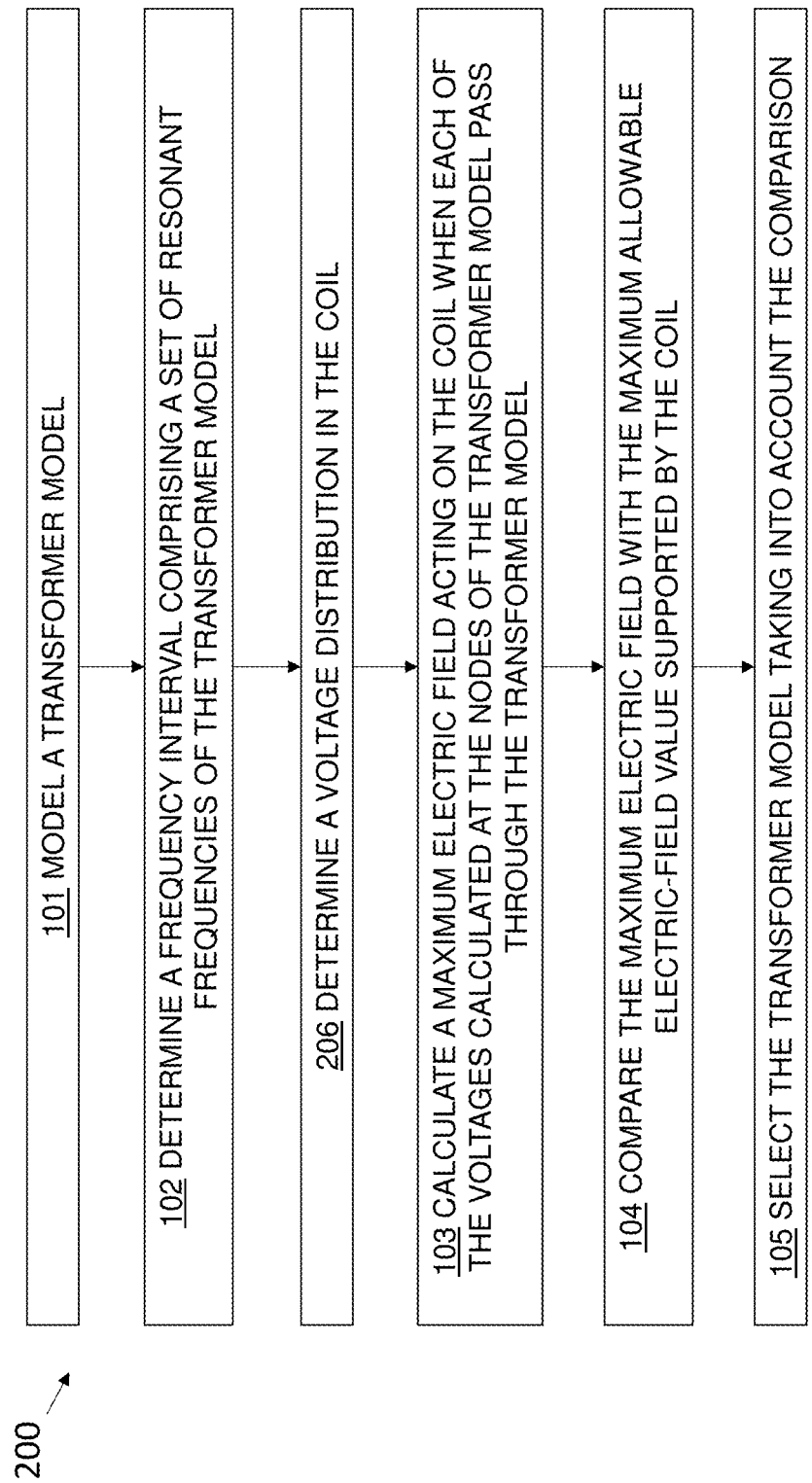
FIG. 4 shows a second example of a method for selecting a transformer model according to the present disclosure.

FIG. 4 shows a second example of a method 200 for selecting a transformer model. The selection method 200 comprises the blocks 101-105 and a block 206. Blocks 101-105 are the same as blocks 101-105 of the selection method example 100. They will consequently not be described in detail again.

Block 206 comprises the determination of a voltage distribution in the coil 10. The determination of the voltage distribution is carried out by the computer system 400. In particular, the determination of the voltage distribution is carried out on the basis of the simulation of the passage of a voltage oscillating at a given frequency through the transformer model. In certain examples, the given frequency is included in the frequency interval comprising the set of resonant frequencies of the transformer model. In certain cases, the given frequency corresponds to one of the resonant frequencies of the transformer model. The voltage distribution makes it possible to determine an amplification factor of the voltage acting on the coil 10 for each slice 12. The voltage distribution also makes it possible to determine a variation of a voltage gradient between each slice 12 of the coil 10.

Figure 5:
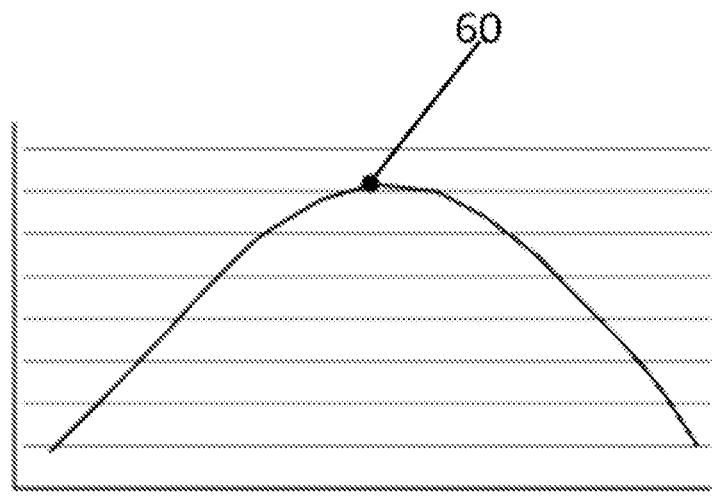
FIG. 5 shows a graph representing an example of a voltage distribution curve associated with the coil of FIG. 2.

FIG. 5 shows a graph representing an example of a voltage distribution associated with the coil 10. The abscissa axis corresponds to a ratio of a length of the coil 10 through which the voltage acting on the coil 10 travels to a total length of the coil 10. The ordinate axis corresponds to the amplification factor of the voltage acting on the coil 10.

The voltage distribution shows in this case that a maximum value of the amplification factor of the voltage acting on the coil 10 is obtained at a point 60 located substantially halfway along the total length of the coil 10. This means that a slice 12 located in proximity to the point 60 concentrates more voltage than the other slices. In certain cases, the higher the maximum value of the amplification factor of the voltage, the greater the risk of breakdown of the transformer. Thus, the selection method 200 aims in certain cases to select the transformer model whose voltage distribution has a low maximum amplification-factor value. This involves selecting the transformer model having a substantially flat voltage distribution curve.

The graph representing the voltage distribution also reflects the variation of the voltage gradient between each slice 12 of the coil 10. The voltage gradient makes it possible to analyse a difference between values of the voltage between two spaces 14. The variation of the difference between values of the voltage between two spaces 14 is in certain cases particularly large at the ends of the coil 10, which is reflected by the slope of the voltage distribution in the zones of the graph of FIG. 5 corresponding to the ends of the coil 10. In certain cases, the greater the slope of the voltage distribution, the greater the voltage gradient in the coil. The higher the voltage gradient, the greater the risk of breakdown of the transformer. Thus, the selection method 200 aims in certain cases to select the transformer model whose voltage gradient is small. This involves selecting the transformer model having a substantially flat voltage distribution curve.

Thus, in certain cases, on the basis of the modelling according to block 101, an attempt is made to obtain a transformer model whose voltage distribution is as flattened as possible. This it makes it possible on the one hand to avoid very high amplification factors. On the other hand, the flattened voltage distribution means that the voltage gradient in the coil is small.

A decrease in the number of slices 12, an increase in the length L1 of the spaces 14, a decrease in the number of turns in each slice 12 or an increase in the distance between concentric high-voltage coils and low-voltage coils may lead to a reduction of the voltage gradient in the coil 10, so as to lead to flattening of the voltage distribution.

It should be noted that, in certain cases, the highest amplification factors are obtained when the voltage passing through the transformer model oscillates at a frequency corresponding to the frequency associated with the first trough 44 of the respective impedance curve of the transformer model.

In the example of FIG. 4, the determination of the voltage distribution according to block 206 takes place after the determination of the frequency interval according to block 102. In certain cases, the determination of the voltage distribution according to block 206 may take place at any moment between the determination of the frequency interval according to block 102 and the selection of the transformer model according to block 105.

Figure 6:
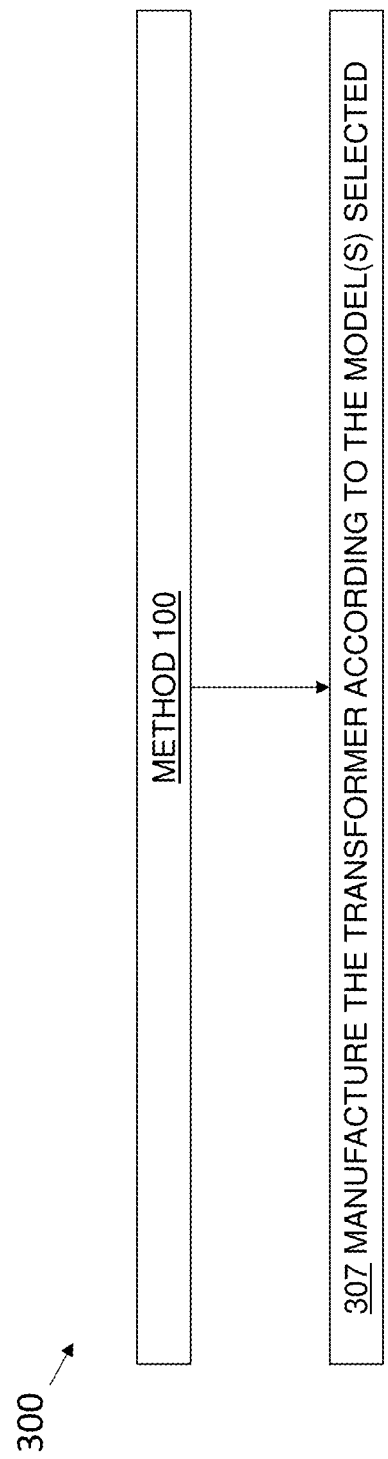
FIG. 6 shows an example of a method for manufacturing a transformer according to the present disclosure.

The present explanation also relates to an example of a method 300 for manufacturing a transformer. FIG. 6 shows an example of the method 300 for manufacturing the transformer. The method 300 comprises blocks 100 and 307. Block 100 corresponds to the selection method example 100 described above. It will consequently not be described in detail below. In certain cases, the method 300 for manufacturing a transformer could comprise blocks 200 and 307, block 200 corresponding to the selection method example 200 described above. In particular, the manufacturing method aims to obtain in material form the transformer corresponding to the transformer model selected after applying the method 100 for selecting a transformer model. When a plurality of transformer models are selected after applying the selection method 100, the manufacturing method 300 may aim to obtain each of the transformer models selected.

Block 307 comprises the manufacture of the transformer according to the model(s) selected on the basis of the method 100. The manufacture makes it possible to obtain in physical form the transformer(s) corresponding to the transformer model(s) selected. In certain examples, the transformer manufactured is a dry-coated transformer.

Figure 7:
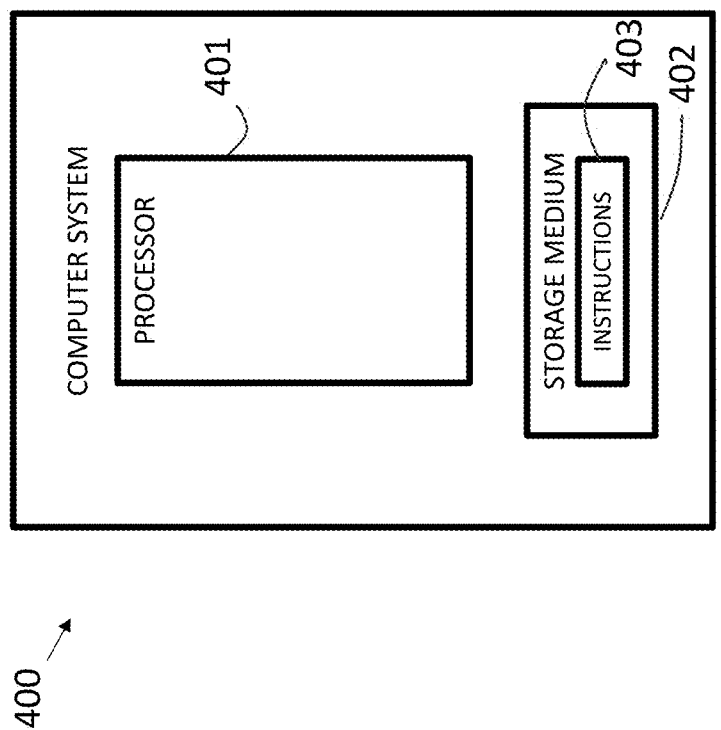
FIG. 7 schematically represents an example of a computer system according to the present disclosure.

FIG. 7 shows an example of a computer system 400 comprising a processor 401. The processor 401 is, for example, configured to carry out the method 100 or 200 for selecting a transformer model according to the examples described above. The processor 401 may comprise electronic calculation circuits managed by an operating system.

The computer system 400 furthermore comprises a non-volatile storage medium 402 which is machine-readable or can be read by the computer system 400. The storage medium 402 is, for example, a memory or a storage unit. The storage medium 402 according to the present disclosure may in particular be any type of electronic, magnetic or optical storage device, or another physical device which stores executable instructions. The memory may for example be a random-access memory (RAM), an electrically erasable programmable read-only memory (EEPROM), a memory card reader, an optical disc, etc.

The storage medium 402 may, for example, store a computer program according to the present disclosure. The computer program contains instructions 403 for carrying out the method 100, 200 for selecting a transformer model as described above. The computer program is executed by the processor 401.

As described above, the computer system 400 may furthermore comprise a graphical interface (not illustrated) allowing the user to manually choose the structural parameters of the coil 10 being modelled.

The invention claimed is:

1. A method for selecting a transformer model, the method carried out by a computer system, the method comprising:
modelling a transformer model comprising a coil configured to support an electric field;
determining a frequency interval comprising a set of resonant frequencies of the transformer model;
calculating a maximum electric field acting on the coil when a voltage oscillating over said frequency interval passes through the transformer model;
comparing the maximum electric field with a maximum allowable electric-field value;
selecting the transformer model as a function of a result of the comparing the maximum electric field with the maximum allowable electric-field value;
instructing manufacture of a transformer based on the transformer model selected; and
manufacturing the transformer according to the selected model.

2. The method according to claim 1, wherein determining the frequency interval comprising the set of resonant frequencies of the transformer model is carried out on the basis of determining an impedance response of the transformer model.

3. The method according to claim 1, further comprising determining a voltage distribution in the coil.

4. The method according to claim 3, wherein selecting the transformer model takes into account a characteristic of the voltage distribution in the coil.

5. The method according to claim 1, wherein modelling the transformer model comprises modelling the coil with a plurality of slices, each slice of the coil comprising a plurality of turns.

6. The method according to claim 5, wherein modelling the transformer model comprises modelling the coil with a space provided between each slice of the coil.

7. The method according to claim 5, wherein modelling the transformer model comprises choosing a material arranged between each turn of the plurality of turns of the coil.

8. The method according to claim 1, wherein modelling the transformer model comprises choosing a resin for coating the coil.

9. The method according to claim 5,
wherein modelling the transformer model comprises modelling the coil with a space provided between each slice of the coil;
wherein modelling the transformer model comprises choosing a material arranged between each turn of the plurality of turns of the coil; and
wherein modelling the transformer model comprises choosing a resin for coating the coil; and
wherein the coil is modelled so as to choose at least one structural parameter from:
a total number of slices;
a total number of turns in each slice;
a length of the space provided between each slice of the coil;
a distance between concentric high-voltage coils and low-voltage coils;
the material arranged between each turn of the plurality of turns of the coil; and
the resin coating the coil.

10. The method according to claim 1, further comprising modelling one or more additional transformer model(s), each additional transformer model comprising a respective coil configured to support a respective electric field, the method further comprising determining a frequency interval comprising a set of respective resonant frequencies of each additional transformer model.

11. The method according to claim 1, the transformer being a dry-coated transformer.

12. A computer program product comprising a non-transitory computer-readable storage medium having a computer program stored thereon, the computer program comprising computer-executable instructions for carrying out the method for selecting a transformer model according to claim 1 when the computer-executable instructions are executed by a processor.

13. A computer system comprising a processor configured to carry out the method for selecting a transformer model according to claim 1.

14. A method for selecting a transformer model, the method carried out by a computer system, the method comprising:
modelling a transformer model comprising a coil configured to support an electric field;
determining a frequency interval comprising a set of resonant frequencies of the transformer model;
calculating a maximum electric field acting on the coil when a voltage oscillating over said frequency interval passes through the transformer model;
comparing the maximum electric field with a maximum allowable electric-field value;
selecting the transformer model as a function of a result of the comparing the maximum electric field with the maximum allowable electric-field value;
instructing manufacture of a transformer based on the transformer model selected; and
manufacturing and/or causing manufacturing of at least a portion of the transformer with at least one physical aspect of the transformer being manufactured in accordance with the transformer model.

15. The method according to claim 14, wherein determining the frequency interval comprising the set of resonant frequencies of the transformer model is carried out on the basis of determining an impedance response of the transformer model.

16. The method according to claim 14, further comprising determining a voltage distribution in the coil, wherein selecting the transformer model takes into account a characteristic of the voltage distribution in the coil.

17. The method according to claim 14, wherein modelling the transformer model comprises at least one of the group comprising:
(1) modelling the coil with a plurality of slices, each slice of the coil comprising a plurality of turns;
(2) modelling the coil with a space provided between each slice of the coil;
(3) choosing a resin for coating the coil;
(4) modelling the coil with a space provided between each slice of the coil;
(5) choosing a material arranged between each turn of the plurality of turns of the coil;
(6) choosing at least one structural parameter of the group of structural parameters comprising:
a total number of slices;
a total number of turns in each slice;
a length of the space provided between each slice of the coil;
a distance between concentric high-voltage coils and low-voltage coils;
the material arranged between each turn of the plurality of turns of the coil; and
the resin coating the coil.

18. The method according to claim 14, wherein two or more transformer models are selected and manufacturing at least a portion of the transformer includes manufacturing the transformer according to the two or more selected transformer models.

19. A computer program product comprising a non-transitory computer-readable storage medium having a computer program stored thereon, the computer program comprising computer-executable instructions for carrying out the method for selecting a transformer model according to claim 14 when the computer-executable instructions are executed by a processor.

20. A computer system comprising a processor configured to carry out the method for selecting a transformer model according to claim 14.

* * * * *